US009729221B2

United States Patent
Neuhaus et al.

(10) Patent No.: US 9,729,221 B2
(45) Date of Patent: Aug. 8, 2017

(54) METHOD FOR FEEDBACK REPORTING AND A MOBILE COMMUNICATIONS DEVICE

(71) Applicant: Intel IP Corporation, Santa Clara, CA (US)

(72) Inventors: Holger Neuhaus, Munich (DE); Yeong-Sun Hwang, Oberhaching (DE); Dae Jung Yoon, Santa Clara, CA (US); Axel Clausen, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 47 days.

(21) Appl. No.: 14/751,217

(22) Filed: Jun. 26, 2015

(65) Prior Publication Data

US 2016/0380687 A1    Dec. 29, 2016

(51) Int. Cl.
*H04B 7/06*     (2006.01)
*H04B 17/345*   (2015.01)
*H04B 15/00*    (2006.01)
*H04W 84/04*    (2009.01)

(52) U.S. Cl.
CPC ........... *H04B 7/0626* (2013.01); *H04B 15/00* (2013.01); *H04B 17/345* (2015.01); *H04W 84/045* (2013.01)

(58) Field of Classification Search
None
See application file for complete search history.

(56) References Cited

U.S. PATENT DOCUMENTS

| | | | |
|---|---|---|---|
| 2012/0082274 A1 | 4/2012 | Bury | |
| 2013/0242896 A1* | 9/2013 | Son | H04W 72/085 370/329 |
| 2013/0301432 A1* | 11/2013 | Hammarwall | H04W 24/02 370/252 |
| 2014/0064227 A1 | 3/2014 | Zhang et al. | |
| 2014/0078939 A1 | 3/2014 | Shirani-Mehr et al. | |
| 2014/0204781 A1* | 7/2014 | Horvat | H04W 24/00 370/252 |

OTHER PUBLICATIONS

International Search Report received for corresponding PCT Application No. PCT/US2016/033859 dated Aug. 24, 2016, 11 pages.
(Continued)

*Primary Examiner* — Anh Ngoc Nguyen
(74) *Attorney, Agent, or Firm* — Viering, Jentschura & Partner MBB (57) ABSTRACT

A method and mobile communications device for receiving a composite signal composed of a plurality of resource elements, the plurality of resource elements including: a plurality of data resource elements subject to interference; measuring a first noise plus interference level on at least one predefined resource element from the plurality of resource elements; measuring a noise plus interference level on the plurality of data resource elements subject to interference; determining a baseline noise plus interference level common to the plurality of data resource elements subject to interference; and generating a hybrid noise plus interference level by replacing the baseline noise plus interference level with the first noise plus interference level from the at least one predefined resource element.

20 Claims, 6 Drawing Sheets

(56) References Cited

OTHER PUBLICATIONS

Media Tek et al., "Way forward on intra-cell interference scenarios for MUST", R1-153441, 3GPP TSG RAN WG1 Meeting #81, Jun. 2015, 3 pages.

Nokia Networks et al., "On LTE LAA inter-cell interference management mechanisms", R1-150456, 3GPP TSG RAN WG1 Meeting #80, Feb. 2015, 2 pages.

* cited by examiner

METHOD FOR FEEDBACK REPORTING AND A MOBILE COMMUNICATIONS DEVICE

TECHNICAL FIELD

Various embodiments relate generally to a method for feedback reporting and a mobile communications device.

BACKGROUND

Link adaptation presents challenges in coordinated multipoint transmission (CoMP) networks in the context of wireless communications. Specifically, this disclosure may provide a framework for esitmating channel state information (CSI) at a communication receiver, such that the CSI estimate remains a reliable and robust metric for link adaptation (LA) purposes even in the presence of interference.

Communication systems may employ non-data reference signals (RS) of known pattern to assist receivers in CSI estimation for downlink (DL) channel quality assessment. In a CoMP network, network capacity and user equipment (UE) throughput (TP) are meant to be optimized by intelligently coordinating activities across multiple cooperating transmitters. Controlling a multitude of transmitters may require multiple instances of CSI estimates in order to allow the network the selection of which transmitter(s) to use on the DL, and their respective configurations, e.g., modulation and coding scheme (MCS) selection.

The UE may be asked to have its measurements based on separate sets of resource elements (RE) for each CSI estimate, with noise and interference conditions being potentially substantially different among these RE-sets, as well as independent from the noise and interference situation seen on the data signal. Interference not present on REs designated for a particular CSI estimate, despite seen potentially relevant for the TP optimization of the data signal, will not be considered in certain CSI reporting. This may lead to sub-optimum CSI reporting, increased block error rate (BLER), and thus, reduced TP.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

The term "base station", used in reference to an access point of a mobile communication network, may be understood as a macro base station, micro base station, Node B, evolved Node B (eNB), Home eNodeB, Remote Radio Head (RRHs), or relay point, etc.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or sectors), where each cell is characterized by a distinct communication channel. An "inter-cell handover" may be understood as a handover from a first "cell" to a second "cell", where the first "cell" is different than the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

Like terms for specific details and embodiments should be treated as such throughout the disclosure. A specific detail or embodiment may be described in detail in only one part of the disclosure in the interests of brevity and readability, however, any details apply to all uses of the term throughout the disclosure, unless specifically noted otherwise.

It is to be noted the ensuing description discusses utilization of the mobile communications device under 3GPP (Third Generation Partnership Project) specifications, notably Long Term Evolution (LTE) and Long Term Evolution-Advanced (LTE-A). Other mobile radio communication systems, however, may also be used, where applicable. The examples provided herein can apply to other existing or other not yet formulated standards, so long as they share the underlying features disclosed in the following examples.

In order to maximize utilization of advanced communication technologies, e.g., transmission mode nine (TM9), transmission mode ten (TM10), or CoMP, accurate quality assessments of communication links are required. These assessments may be known as channel state information (CSI), and may be composed of multiple assessment indicators, e.g., channel quality indicators (CQIs), precoding matrix indicators (PMIs), and rank indicators (RIs) (see, e.g., 3GPP LTE Release 10). The CSI may also be composed of a corresponding interference measurement, e.g., a CSI interference measurement (CSI-IM). For CoMP downlink, a UE may have multiple quality assessment processes, e.g., CSI processes, for optimum functionality. These processes, including, for example, CSI-IM, enable operation of technologies such as CoMP. Such quality assessment processes may be configured to make interference measurements on designated resource elements (REs) for reliable and robust link adaptation.

Other advanced communication technologies look to improve communications within the coverage area of a single cell, e.g., a macrocell, by introducing base stations with varying transmission powers, e.g., microcells, picocells, or femtocells, within that cell. A network with various types of cells may be known as a hetereogeneous network, or a HetNet. A UE within coverage range of multiple cell types may experience interference from the various cells. Some technologies may mitigate the interference through various techniques such as scheduling when and what each cell may transmit, as well as on what frequency, e.g., intercell interference coordination (ICIC), enhanced intercell interference coordination (eICIC), or further enhanced intercell interference coordination (feICIC). Some UEs may simply experience interference from two macro cells if the UE is located on a cell edge.

Intercell interference mitigation technologies may reduce some aspects of interference between an aggressor cell (a cell causing interference) and a victim cell (a cell experiencing the interference), while introducing interference in other ways, e.g., a UE may now experience interference on parts of its physical downlink shared channel (PDSCH). When the interference introduced by, for example, eICIC, is coupled with interference measurements processes (link adaptation) that designate which REs should be used for the measurements, the resulting quality assessment reports, e.g., CSI-IM and CSI, may not take this interference into account, and thus report a less accurate, or less comprehensive overview of the quality of a channel, which may lead to sub-optimum CSI reporting, increased block error rate (BER), and hence, reduced throughput. Accordingly, the following description provides detail for the solution of the above issue.

Figure 1:
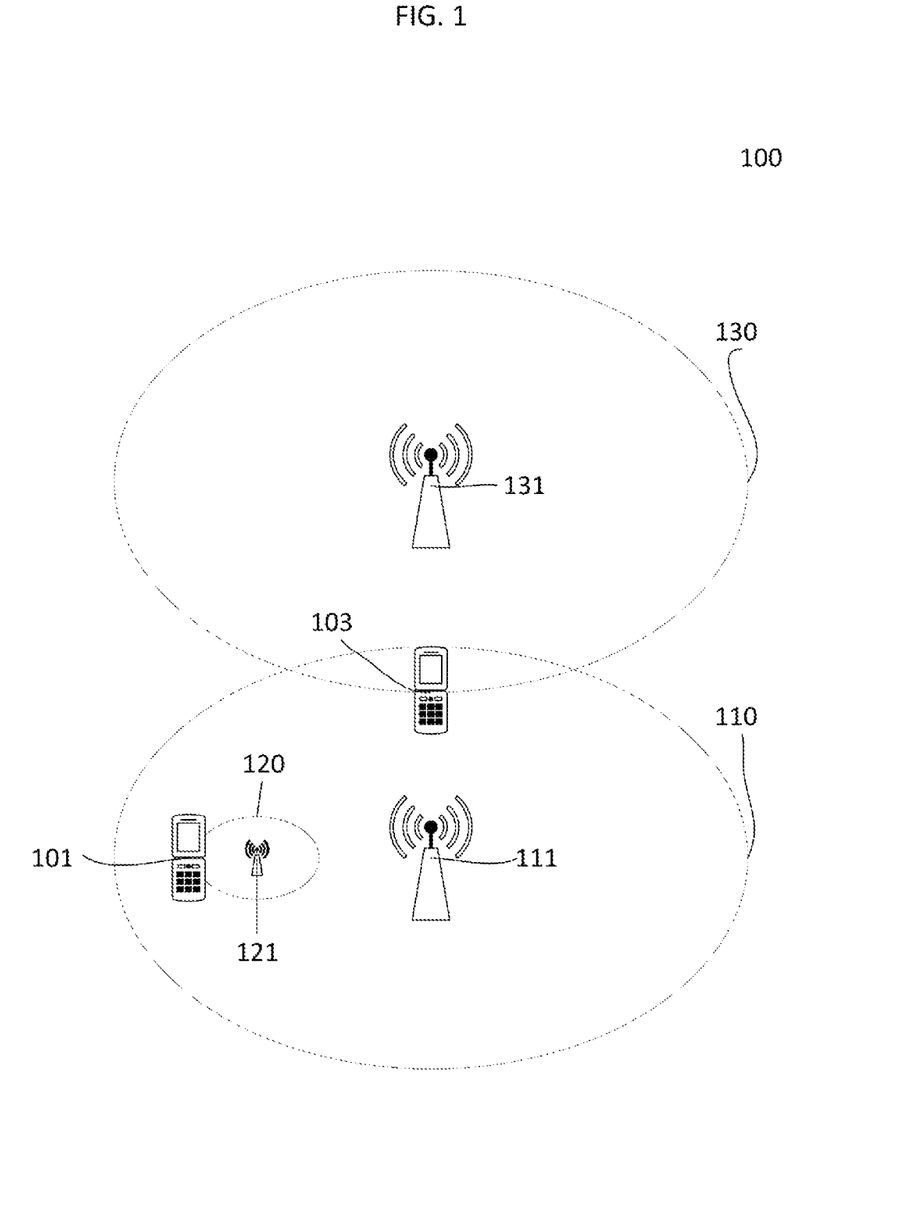
FIG. 1 shows a heterogeneous mobile communications network 100.

FIG. 1 shows a heterogeneous mobile communications network 100.

The coverage area 110 of macrocell 111 may include picocell 121, which may have a coverage area 120. Additionally, macrocell 131 may have coverage area 130. UE 101 is located in both respective coverage areas 110 and 120, and may then experience interference from picocell 121 or macro cell 111. Likewise, UE 103 is on the edges of coverage area 110 and coverage area 130, and UE 103 may experience interference from either macrocell 131 or macrocell 111. HetNet 100 may provide intercell interference mitigation technologies, e.g., ICIC, eICIC, or feICIC, to reduce aspects of this interference.

Figure 2:
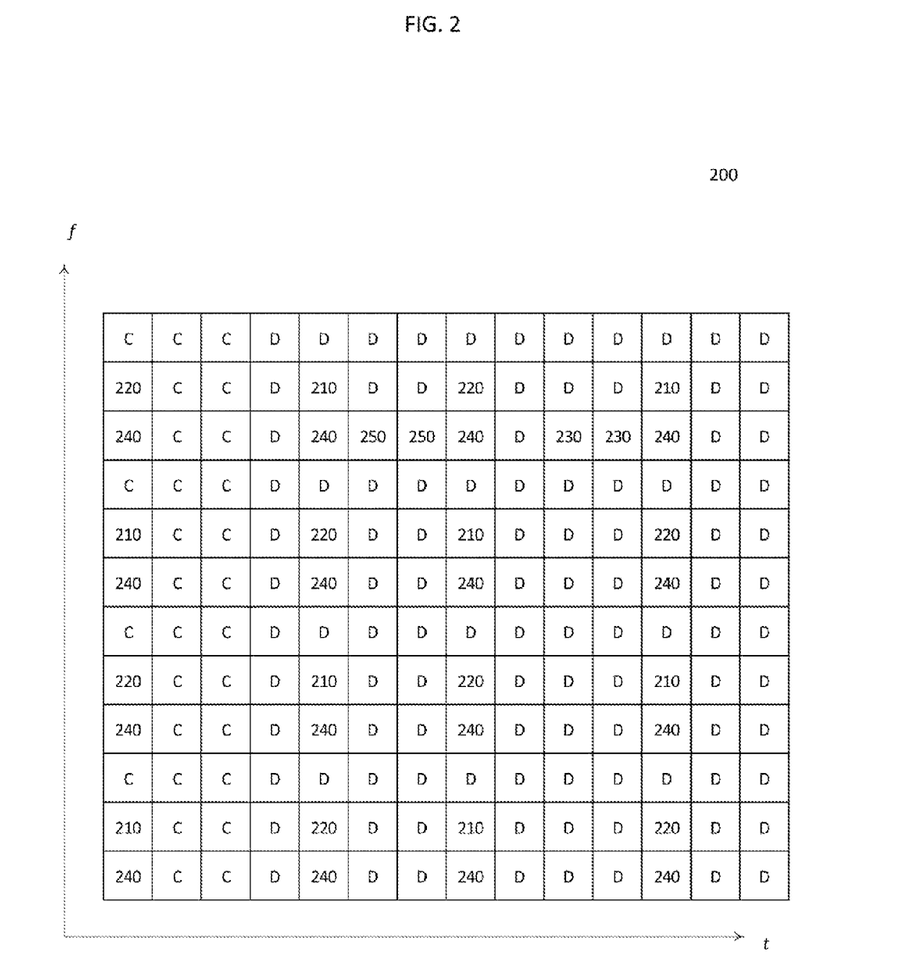
FIG. 2 illustrates a composite signal 200 including resource elements.

FIG. 2 illustrates a composite signal 200 including resource elements.

Composite signal 200 illustrates the issue described above for UE 101 or UE 103. In addition, composite signal 200 may include resource elements (REs) occupying time and frequency arranged in a grid array with time on the horizontal axis and frequency on the vertical axis (e.g., subcarriers in frequency and orthogonal frequency-division multiplexing (OFDM) symbols in time). FIG. 2, for example, illustrates a physical resource block (PRB) pair with 168 REs with the first three columns representative of control data on the physical downlink control channel (PDCCH), designated "C", and the remaining columns for user data traffic on the physical downlink shared channel (PDSCH), designated "D", i.e., FIG. 2 illustrates reception of PDCCH data and PDSCH data, respectively, as being defined in time.

A channel quality assessment technology may identify at least one predefined resource element 230, e.g., CSI-IM, for a feedback report to maximize downlink throughput. This measurement may be used to estimate interference experienced on the composite signal 200, e.g., data on the PDSCH. Composite signal 200 may also include a cell-specific reference signal (CRS) on REs 240. The CRS RE 240 may be utilized for channel estimation and scheduling, e.g., measurement of a noise plus interference level or noise level that may represent a noise and interference level that is common to all data REs. Additionally, composite signal 200 may include a channel state information reference signal 250 (CSI-RS).

The composite signal 200 for a UE, e.g., UE 101 or UE 103, may be subject to interference from neighbor cells or other cells in a HetNet arrangement, e.g., macrocell 131 or picocell 121. Despite utilizing technologies developed to coordinate activities of multiple cells some interference may still be present, such as that seen on the REs 210 and 220, i.e., FIG. 2 illustrates underlying control data "C" REs or user data traffic "D" REs that are subject to interference, i.e., control data or user data traffic signals are received in the REs, in addition to an interfering signal. These REs subject to interference have been designated as REs 210 or 220, respectively. As illustrated here, REs 210 and 220 are subject to interference by a cell-specific reference signal (CRS) from a neighbor cell (NC). The interference on RE 210 may come from a first neighbor cell (which may be designated $p_0$ in equations below), and the interference on RE 220 may come from a second neighbor cell (which may be designated $p_1$ in equations below). Alternatively, REs 210 and 220 may experience interference from the same neighbor cell, which may commonly be the case in LTE, and may represent a single interference source.

As can be seen from the grid array of composite signal 200, if the interference measurements are performed on REs 230 to represent interference seen by data, e.g., on the PDSCH, the interference affecting REs 210 and 220, respectively, may not be taken into account. Any quality assessment feedback based on these estimations, may not be comprehensive, and thus negatively impact throughput by providing overly optimistic quality assessments.

Figure 3:
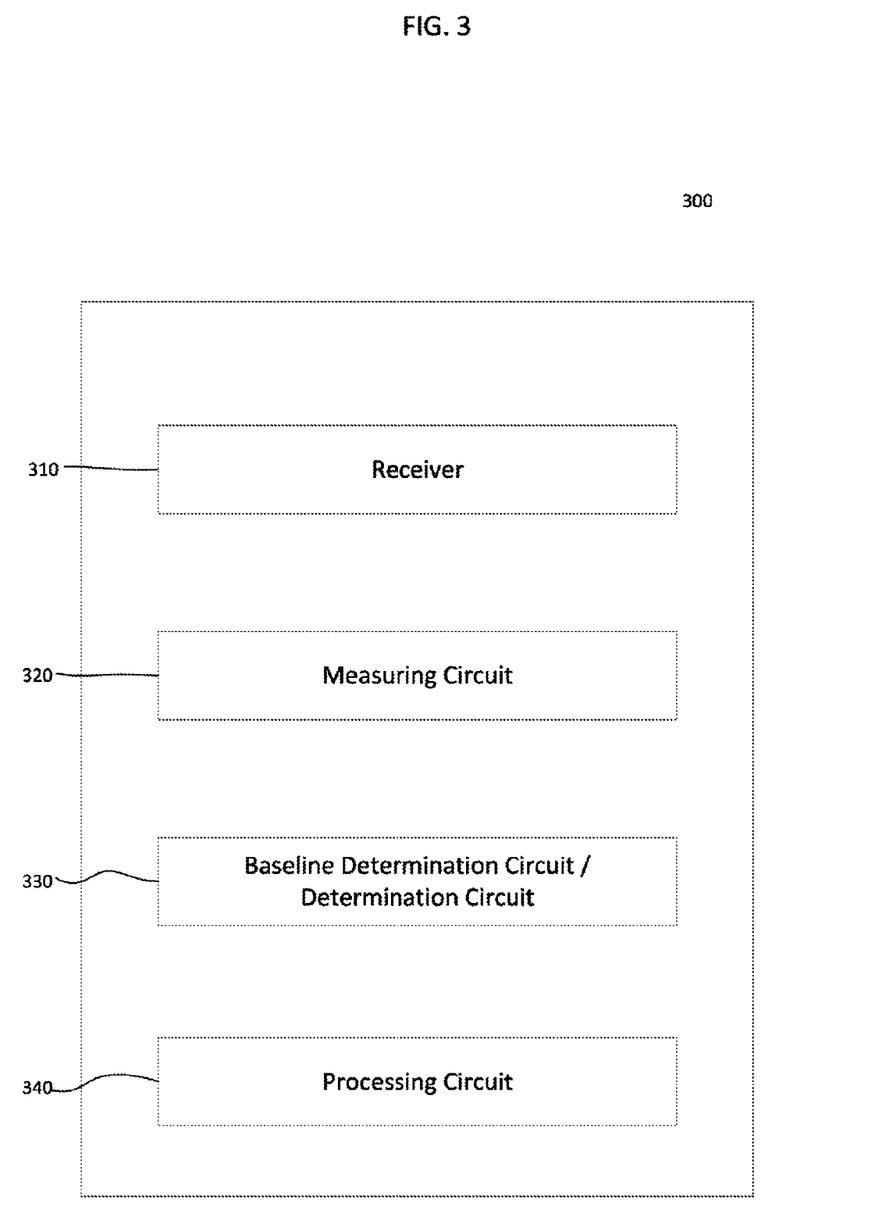
FIG. 3 is a block diagram illustrating a mobile communications device 300 in accordance with this disclosure.

FIG. 3 is a block diagram illustrating a mobile communications device 300 in accordance with this disclosure.

The mobile communications device 300 may include a receiver 310. The receiver 310 may be configured to receive a composite signal 200 which may include a plurality of resource elements. The plurality of resource elements may include: REs that include control data, e.g., for a PDCCH; user data traffic, e.g., for a PDSCH; a plurality of data resource elements 210 or 220 subject to interference, e.g., user data traffic REs that experience interference from neighbor cells, e.g., the CRS of a neighbor cell; cell reference signal REs for channel estimation and scheduling, e.g., CRS REs 240 utilized by the UE 101 or UE 103; reference signal REs for advanced channel estimation and scheduling, e.g., at least one further predefined resource element that may be a channel quality reference signal and a frequency scheduling reference signal or a CSI-RS RE 250; and interference measurement REs 230 for advanced interference measurements, e.g., CSI-IM.

The mobile communications device 300 may further include a measuring circuit 320. The measuring circuit 320 may measure a first noise plus interference level on at least on predefined resource element from the plurality of resource elements. The at least one predefined resource element may be designated for an interference measurement, e.g., CSI-IM RE 230. The first noise plus interference level may be a noise plus interference power level measurement, e.g., based on a measurement of the CSI-IM. The first noise plus interference level may generally correspond to an interference level component, e.g., the CSI-IM.

The measuring circuit 320 may also measure a noise plus interference level on the plurality of data resource elements subject to interference, e.g., interference caused by a neighbor cell, such as REs 210 and 220. The noise plus interference level may generally correspond to a noise level component and an interference level component, e.g., as measured on REs 210 and 220 which may, respectively, be subject to different neighbor cells. Additionally or alternatively, the interference may be from a microcell, a picocell, or a femtocell.

A baseline determination circuit 330 may be included in mobile communications device 300. The baseline determination circuit 330 may measure a baseline noise plus interference level common to the plurality of data resource elements subject to interference, e.g., a measurement based on CRS REs 240 may be representative of a noise plus interference level that is common to all user data traffic REs. The baseline noise plus interference level may generally correspond to a noise level component that is common to all user data traffic REs, i.e., forms a baseline noise level.

Processing circuit 340 may also be included in mobile communications device 300. The processing circuit 340 may generate a hybrid noise plus interference level by replacing the baseline noise plus interference level with the first noise plus interference level from the at least one predefined resource element. The hybrid noise plus interference level may generally correspond to an interference level component from the REs subject to interference, e.g., REs 210 and 220, as well as an interference level component, e.g., CSI-IM, measured on predefined resource elements, e.g., REs 230. The hybrid noise plus interference level may thus be a more accurate, or comprehensive, estimation of interference levels.

In other words, mobile communications device 300 may include a determination circuit 330, which may determine an interference level component from the plurality of data resource elements subject to interference. Processing circuit 340 may then generate a hybrid noise plus interference level (as described above) by combining the interference level component from the plurality of data resource elements subject to interference with the first noise plus interference level from the at least one predefined resource element. Again, the hybrid noise plus interference level may thus be a more accurate, or comprehensive, estimation of interference levels.

Figure 4:
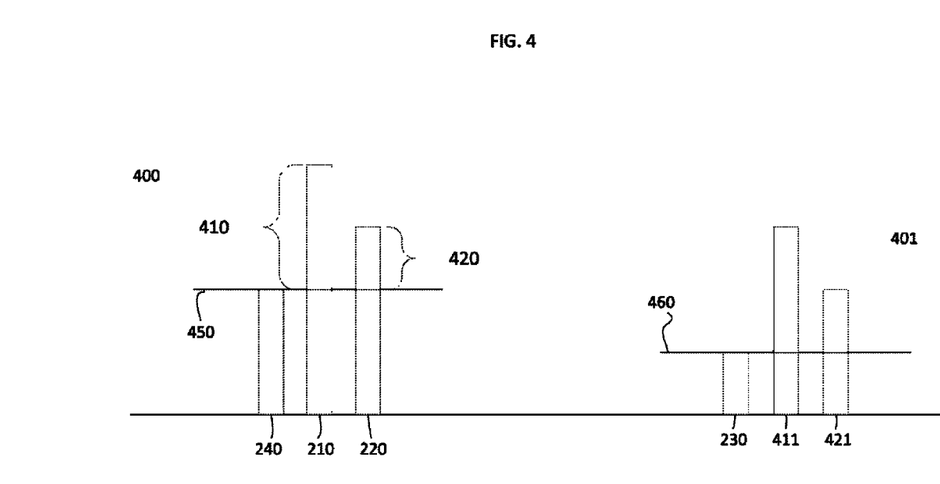
FIG. 4 graphically represents noise+interference levels composed of multiple contributors.

FIG. 4 graphically represents generating a hybrid noise plus interference level.

Graphs 400 and 401 of FIG. 4 have noise plus interference power on the vertical axis. The horizontal axis indicates what RE groups may be measured or represented. REs with corresponding noise plus interference levels may be associated in respective RE groups. A measured noise plus interference power level for each of RE groups 210 and 220, respectively, are indicated in graph 400. These measurements may be in addition, or extra, to designated CSI reporting measurements. As can be seen, noise plus interference levels may be substantially different between the sets of REs 210 and 220. RE groups 210 and 220 subject to interference may have a baseline, or common, noise plus interference level 450, which may effectively be equal to the noise power level seen on all RE groups. The noise plus interference level of REs 240, e.g., CRS 240, may represent or be approximately equal to the baseline, or common, noise plus interference level 450. This may represent, for example, a typical eICIC scenario where CRS based noise and interference observations are, by default, applicable to all PDSCH REs, and additional interference is present on certain RE positions, e.g., due to almost blank subframe (ABS) non-collider CRS interference. By determining the common noise plus interference level 450 (or effectively the noise level component), the interference level components 410 and 420 of the respective interfered RE groups 210 and 220 may be determined.

Graph 401 represents the hybrid noise plus interference levels 411 and 421 for the respective interfered RE groups 210 and 220. The CSI-IM measurement from REs 230 may represent the noise plus interference power level measurement that the UE may be designated to measure, which corresponds to a level 460. Interference levels 410 and 420 may then be combined with, or mapped to, the CSI-IM measurement on REs 230 to generate more comprehensive noise plus interference level measurements 411 and 421, respectively, which each correspond to the interference level components of the REs 210 and 220.

To generate hybrid noise plus interference level 411 and further hybrid noise plus interference level 412, the plurality of resource elements of the composite signal 200 may further include at least one further plurality of data resource elements subject to at least one further interference, e.g., as illustrated above where hybrid level 411 may correspond to a measurement originating from a measurement ($p_0$) on REs 210 that may relate to interference from a neighbor cell CRS, and hybrid level 421 may correspond to a measurement originating from a measurement ($p_1$) on REs 220 that may relate to interference from a distinct neighbor cell CRS. The at least one further interference may be different from the interference of the plurality of data resource elements subject to interference. The measurement circuit may then measure the at least one further noise plus interference level on the plurality of data resource elements subject to at least one further interference, and the processing circuit may generate at least one further hybrid noise plus interference level by replacing the baseline noise plus interference level with the first noise plus interference level from the at least one predefined resource element.

This may be generated by calculating the total noise plus interference power $P_i$ per RE group "i" as the sum of the diagonal elements of the noise covariance matrix R per RE group "i", where "tr" denotes the trace operation.

$$P_i = tr(R_i) \tag{1}$$

Next, the total noise plus interference power $P_{CSI-IM}$ may be calculated for the CSI-IM RE group as the sum of the diagonal elements of the noise covariance matrix $R_{CSI-IM}$.

$$P_{CSI-IM} = tr(R_{CSI-IM}) \quad (2)$$

Then, the adjusted interference powers $P_i'$ for each RE group "i" may be calculated by replacing the CRS-based noise plus interference power level $P_0$ with $P_{CSI-IM}$.

$$P_i' = P_i - P_0 + P_{CSI-IM} \quad (3)$$

The hybrid noise plus interference levels may be implemented into feedback reporting in various ways. For example, the hybrid noise plus interference level 411 and the further hybrid noise plus interference level 421 may each individually be utilized for feedback processing, or a less processor intensive variation of the hybrid noise plus interference level 411 in combination with further hybrid noise plus interference level 421 may be utilized.

A first example implementation may consider the net effect of interference, e.g., eICIC interference, by scaling the CSI-IM related noise plus interference measurement. Processing circuit 340 may determine a modification factor for a covariance estimate of the measured first interference level. The modification factor may be a power ratio scaling factor derived from the hybrid noise plus interference level and the noise plus interference level from the resource elements subject to interference. The covariance estimate may include covariance data in the form of a noise covariance matrix.

The processing circuit 340 may then generate a whitening filter output based on the modified covariance estimate. The whitening filter output may be for inter-cell interference coordination, such as ICIC, eICIC, or feICIC. The whitening filter output may involve a Cholesky decomposition. The whitening filter output may then be incorporated by processing circuit 340 into feedback processing, e.g., CSI reporting, which may combine multiple independent noise and interference measurements, such as weighted metric combining (WMC).

The hybrid noise plus interferences levels may be implemented into feedback reporting as described below. A power ratio scaling factor $\lambda_i'$ may be calculated as the ratio of the modified interference power measurement $P_i'$ to the unaltered noise plus interference power $P_i$ measured on the RE groups$_i$.

$$\lambda_i' = \frac{P_i'}{P_i} = \frac{P_{CSI-IM} - P_0 + P_i}{P_i} = 1 + \frac{P_{CSI-IM} - P_0}{P_i} \quad (4)$$

Scaling factor $\lambda_i'$ may then be applied to the standard CSI-IM covariance matrix $R_{CSI-IM}$.

$$R_i' = \lambda_i' R_i \quad (5)$$

The hybrid (or enhanced) whitening filter outputs $F_i'$, e.g., for eICIC, for each RE group may then be calculated.

$$F_i' = [chol(R_i')]^{-1} \quad (6)$$

Feedback processing may then proceed implemented via multiple independent noise and interference measurements, e.g., $F_i'$ for each RE group, using processes such as WMC.

Alternatively, a reduced complexity variation may be implemented, as it could be more advantageous to avoid excessive additional computational load. Such an implementation may consider the extra interference impact in a single modified noise covariance matrix. This may be advantageous in certain transmission modes, e.g., TM10 in comparison to other transmission modes, when feedback, or quality assessment reporting, may be requested for multiple CSI process, which may already substantially increase computational load. The hybrid noise plus interference levels, e.g., 411, 421, etc., may be implemented in a second example implementation as follows.

In comparison to the example described above, here, the power ratio scaling factor may include the sum of the hybrid noise plus interference level 411 and the at least one further hybrid noise plus interference level 421, where each respective hybrid noise plus interference level may be weighted by a respective number of corresponding resource elements to the plurality of resource elements, e.g., a ratio of the number of interfered REs for each respective group of interfered REs, such as RE group 210 or RE group 220, to the total number of the plurality of, e.g., PDSCH-related REs, as exemplified by 200. The processing circuit 340 may be further configured to modify the covariance estimate with the power ratio scaling factor, as well as to generate a whitening filter output based on the modified covariance estimate. Similar to the exemplary implementation above, the whitening filter output may be an output to coordinate inter-cell interference, e.g., ICIC, eICIC, feICIC, etc. Generating the whitening filter output may include a Cholesky decomposition.

Processing circuit 340 may then be configured to incorporate the whitening filter output, which may be based on the modified covariance estimate, into feedback processing, which in this case may be a single representative noise and interference measurement. This implementation may also be described as follows.

Power ratio scaling factor $\lambda'$ may be calculated as the ratio of the sum of all modified interference power measurements $P_i'$, each weighted by its relative share of REs $n_i/N$ to the unaltered noise plus interference power $P_{CSI-IM}$ which may be measured on the CSI-IM REs 230, where $n_i$ is the number of REs subject to interference in each RE group "i" and where N is the total number of PDSCH-related REs.

$$\lambda' = \frac{\Sigma_{\forall i}\left[\frac{n_i}{N} P_i'\right]}{P_{CSI-IM}} = \frac{P_{CSI-IM} - P_0 + \Sigma_{\forall i}\left[\frac{n_i}{N} P_i\right]}{P_{CSI-IM}} = 1 + \frac{\frac{1}{N}\Sigma_{\forall i}[n_i P_i] - P_0}{P_{CSI-IM}} \quad (7)$$

Scaling factor $\lambda'$ may then be applied to the standard CSI-IM noise covariance matrix $R_{CSI-IM}$.

$$R'_{CSI-IM} = \lambda' R_{CSI-IM} \quad (8)$$

The enhanced whitening filter output $F'_{CSI-IM}$ may then be calculated, e.g., for eICIC.

$$F'_{CSI-IM} = [chol(R'_{CSI-IM})]^{-1} \quad (9)$$

Quality assessment reporting, or feedback processing, may then proceed based on the single (combined) noise plus interference measurement.

Figure 5:
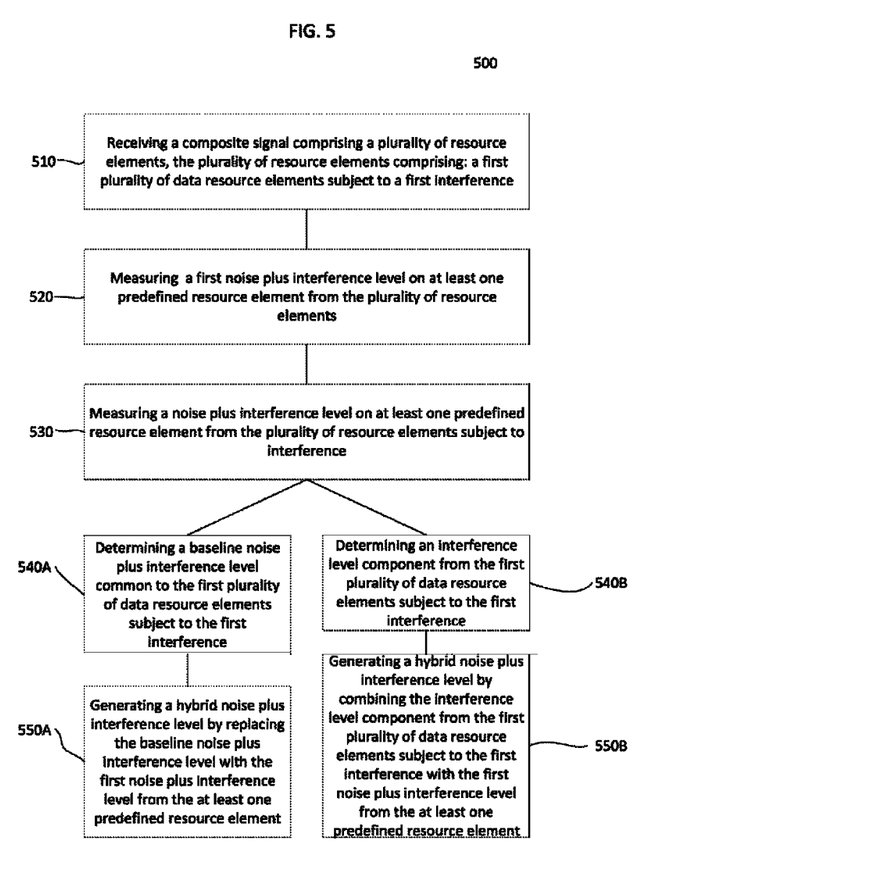
FIG. 5 is a diagram illustrating a method 500 in accordance with the disclosure.

FIG. 5 is a diagram illustrating a method 500 in accordance with the disclosure.

The method may include block 510, which may be receiving a composite signal 200 including a plurality of resource elements, the plurality of resource elements may include a plurality of resource elements subject to interference, e.g., REs 210, 220. The plurality of data resource elements subject to interference, e.g., REs 210 or 220, may be subject to interference from a neighbor cell, e.g., 130, or a microcell, e.g., 120, or a picocell or femtocell, etc. The plurality of resource elements may further include at least one further plurality of data resource elements subject to at least one further interference, e.g., REs 210, 220. The plurality of data resource elements subject to interference may also be interchangeably referred to as the first plurality of data resource elements subject to a first interference. Likewise, the at least one further plurality of data resource elements subject to at least one further interference may interchangeably be referred to as a second plurality of data resource elements subject to a second interference. The interference to the plurality of data resource elements subject to interference may be different from the further interference on the at least one plurality of data resource elements subject to at least one further interference. The plurality of resource elements may also include at least one further predefined resource element, which may be a channel quality reference signal, e.g., a CSI-RS RE 250.

Block 520 of method 500 may be measuring a first noise plus interference level 460 on at least one predefined resource element from the plurality of resource elements 230. The at least one predefined resource RE 230 may be designated for an interference measurement, e.g., a CSI-IM, and the measurement may be a noise plus interference power level. This measurement may effectively be representative of interference.

Block 530 of method 500 may be measuring a noise plus interference level on the plurality of data resource elements subject to interference, e.g., REs 210, 220. This measurement may be a noise plus interference power level composed of a noise component and an interference component.

Block 540A may be determining a baseline noise plus interference level common to the plurality of data resource elements subject to interference, e.g., 450. The baseline noise plus interference level 450 may be measure from cell-specific reference signals, e.g., CRS RE 240. This measurement may effectively be representative of noise. Put another way in block 540B, block 540A may be described as determining an interference level component, e.g., 410, 420, from the plurality of data resource elements subject to interference, e.g., REs 210, 220.

Block 550A of method 500 may be generating a hybrid noise plus interference level, e.g., 411, by replacing the baseline noise plus interference level 450 with the first noise plus interference level, e.g., 460, from the at least one predefined resource element 230. Block 550B may be block 550A put in other words, and may describe generating a hybrid noise plus interference level by combining the interference level component, e.g., 410 or 420, from the plurality of resource elements subject to interference, e.g., REs 210 or 220, with the first noise plus interference level, e.g., 460 from the at least one predefined resource element, e.g., RE 230.

In addition, the at least one further plurality of data resource elements subject to at least one further interference may be measured for at least one further noise plus interference level. At least one further hybrid noise plus interference level may be generated, e.g., 411 or 421, by replacing the baseline noise plus interference level, e.g., 450, with the first noise plus interference level, e.g., 460, from the at least one predefined resource element, e.g., RE 230. In other words, at least one further interference level component, e.g., 410 or 420, may be determined from the at least one further plurality of data resource elements subject to at least one further interference, e.g., REs 210 or 220. An at least one further hybrid noise plus interference level may then be generated by combining the at least one further interference level component, e.g., 410 or 420, from the plurality of data resource elements subject to at least one further interference, e.g., REs 210 or 220, with the first noise plus interference level, e.g., 460, from the at least one predefined resource element, e.g., RE 230.

Again, the hybrid noise plus interference levels may be implemented into feedback reporting in various ways. For example, the hybrid noise plus interference level 411 and the further hybrid noise plus interference level 421 may each individually be utilized for feedback processing, or a less processor intensive variation of the hybrid noise plus interference level 411 in combination with further hybrid noise plus interference level 421 may be utilized.

A first example of the feedback processing may include determining a modification factor for a covariance estimate of the measured first interference level. The modification factor may be a power ratio scaling factor, which may be derived from the hybrid noise plus interference level 411 and the noise plus interference level from the resource elements subject to interference, e.g., REs 210, 220. The covariance estimate may include covariance data, which may be in the form of a noise covariance matrix. The first example may include generating a whitening filter output based on the modified covariance estimate. The whitening filter may be an output applicable to scenarios subject to inter-cell interference, e.g., ICIC, eICIC, feICIC, etc. Generating the whitening filter output may include utilizing a Cholesky decomposition. The whitening filter output may be incorporated into feedback processing, e.g., combining multiple independent noise and interference measurements via WMC.

A second example may have a lower computational load than the first example. The power ratio scaling factor of the second example may include the sum of the hybrid noise plus interference level and the at least one further hybrid noise plus interference level, e.g., 411, 421, where each respective hybrid noise plus interference level may be weighted by the respective number of corresponding resource elements to the plurality of resource elements. The covariance estimate may then be modified by the power ratio scaling factor, and may further include, generating a whitening filter output, e.g., applicable to scenarios subject to inter-cell interference, such as ICIC, eICIC, or feICIC, based on the modified covariance estimate. Generating the whitening filter output may include a Cholesky decomposition. The whitening filter output, based on the modified covariance estimate, may be incorporated into feedback processing as a single noise and interference measurement.

Figure 6:
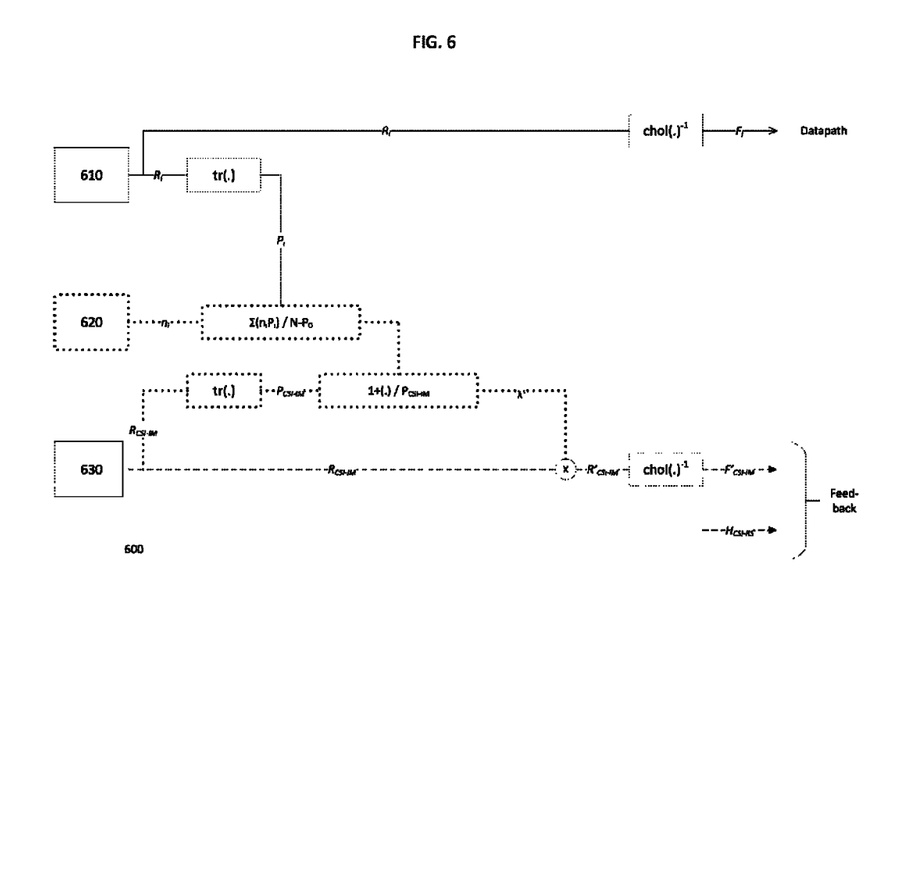
FIG. 6 is a block diagram 600 illustrating an example of feedback processing.

An example of feedback processing, e.g., the second example, for mobile communications device 300 and process 500, described above, may be illustrated by the diagram 600 in FIG. 6. Solid lined 610 may illustrate a noise covariance matrix $R_i$ being utilized for a noise plus interference power level $P_i$ and whitening filter output F, which may be used for whitening of received PRDSCH REs. A link quality assessment, such as, e.g., a feedback report, e.g., for TM10, may be illustrated by dashed line 630. A noise covariance matrix $R_{CSI-IM}$ may be created. This matrix, may be, however, modified, by an example as disclosed herein, illustrated by dotted lined 620. A noise plus interference power level $P_{CSI-IM}$ may be determined from $R_{CSI-IM}$. This may be modified by $\lambda'$, which may be based on a ratio derived from a sum of the hybrid noise plus interference level and the at least one further hybrid noise plus interference level, where each respective hybrid noise plus interference level may be weighted by a respective number of corresponding resource elements to the plurality of resource elements. $R'_{CSI-IM}$ may then be incorporated into feedback reporting according to the type of processing or link adaptation, e.g., TM10.

An example 1 discloses a method for feedback processing, including: receiving a composite signal including a plurality of resource elements, the plurality of resource elements including: a plurality of data resource elements subject to interference; measuring a first noise plus interference level on at least one predefined resource element from the plurality of resource elements; measuring a noise plus interference level on the plurality of data resource elements subject to interference; determining a baseline noise plus interference level common to the plurality of data resource elements subject to interference; and generating a hybrid noise plus interference level by replacing the baseline noise plus interference level with the first noise plus interference level from the at least one predefined resource element.

Example 2 may include the method of example 1, wherein the plurality of data resource elements are subject to interference from a neighbor cell.

Example 3 may include the method of example 1, wherein the plurality of data resource elements are subject to interference from a microcell.

Example 4 may include the method of example 1, wherein the plurality of data resource elements are subject to interference from a picocell.

Example 5 may include the method of example 1, wherein the plurality of data resource elements are subject to interference from a femtocell.

Example 6 may include the method of example 1, wherein the at least one predefined resource element is designated for an interference measurement.

Example 7 may include the method of example 6, wherein the interference measurement is a channel state information interference measurement.

Example 8 may include the method of example 1, wherein the first noise plus interference level is a noise plus interference power level measurement.

Example 9 may include the method of example 8, wherein the first noise plus interference level is a noise plus interference power level channel state information interference measurement.

Example 10 may include the method of example 1, further including: determining the baseline noise plus interference level by measuring a cell specific reference signal.

Example 11 may include the method of example 10, wherein the baseline noise plus interference level is a noise plus interference power level.

Example 12 may include the method of example 1, wherein the plurality of resource elements further includes: at least one further predefined resource element.

Example 13 may include the method of example 12, wherein the at least one further predefined resource element is a channel quality reference signal.

Example 14 may include the method of example 12, wherein the at least one further predefined resource element is a frequency scheduling reference signal.

Example 15 may include the method of example 12, wherein the at least one further predefined resource element is a channel state information reference signal.

Example 16 may include the method of example 1, wherein the plurality of resource elements further include: at least one further plurality of data resource elements subject to at least one further interference.

Example 17 may include the method of example 16, wherein the at least one further interference is different from the interference of the plurality of data resource elements subject to interference.

Example 18 may include the method of example 16 further including: measuring at least one further noise plus interference level on the plurality of data resource elements subject to at least one further interference; and generating at least one further hybrid noise plus interference level by replacing the baseline noise plus interference level with the first noise plus interference level from the at least one predefined resource element.

Example 19 may include the method of example 1 further including: determining a modification factor for a covariance estimate of the measured first interference level.

Example 20 may include the method of example 19, wherein the modification factor is a power ratio scaling factor.

Example 21 may include the method of example 20, wherein the power ratio scaling factor is derived from the hybrid noise plus interference level and the noise plus interference level from the resource elements subject to interference.

Example 22 may include the method of example 19 wherein the model includes covariance data of the noise data.

Example 23 may include the method of example 19, wherein the model is a noise covariance matrix.

Example 24 may include the method of example 1 further including: generating a whitening filter output based on the modified covariance estimate.

Example 25 may include the method of example 24, wherein the whitening filter output is an output for inter-cell interference coordination.

Example 26 may include the method of example 24, wherein the whitening filter output is an output for enhanced inter-cell interference coordination.

Example 27 may include the method of example 24, wherein the whitening filter output is an output for further enhanced inter-cell interference coordination.

Example 28 may include the method of example 24, wherein generating the whitening filter output includes a Cholesky decomposition.

Example 29 may include the method of example 1 further including: incorporating the whitening filter output into feedback processing.

Example 30 may include the method of example 29, wherein the feedback processing includes: combining multiple independent noise and interference measurements.

Example 31 may include the method of example 29, wherein the feedback processing includes: weighted metric combining.

Example 32 may include the method of example 20, wherein the power ratio scaling factor includes: a sum of the hybrid noise plus interference level and the at least one further hybrid noise plus interference level, wherein each respective hybrid noise plus interference level is weighted by a respective number of corresponding resource elements to the plurality of resource elements.

Example 33 may include the method of example 32 further including: modifying the covariance estimate with the power ratio scaling factor.

Example 34 may include the method of example 32 further including: generating a whitening filter output based on the modified covariance estimate.

Example 35 may include the method of example 34, wherein the whitening filter output is an output for inter-cell interference coordination.

Example 36 may include the method of example 34, wherein the whitening filter output is an output for enhanced inter-cell interference coordination.

Example 37 may include the method of example 34, wherein the whitening filter output is an output for further enhanced inter-cell interference coordination.

Example 38 may include the method of example 34, wherein generating the whitening filter output includes a Cholesky decomposition.

Example 39 may include the method of example 34 further including: incorporating the whitening filter output into feedback processing.

Example 40 may include the method of example 39, wherein feedback processing includes a single noise and interference measurement.

Example 41 may include the method of example 40, wherein the single noise and interference measurement is the whitening filter output based on the modified covariance estimate.

An example 42 discloses a method for feedback processing, including: receiving a composite signal including a plurality of resource elements, the plurality of resource elements including: a plurality of data resource elements subject to interference; measuring an interference level on at least one predefined resource element from the plurality of resource elements; measuring a noise plus interference level on the plurality of data resource elements subject to interference; determining a baseline noise level common to the plurality of data resource elements subject to interference; and generating a hybrid interference level by replacing the baseline noise level with the interference level from the at least one predefined resource element.

An example 43 discloses a method for feedback processing, including: receiving a composite signal including a plurality of resource elements, the plurality of resource elements including: a plurality of data resource elements subject to interference; measuring a first noise plus interference level on at least one predefined resource element from the plurality of resource elements; measuring a noise plus interference level on the plurality of data resource elements subject to interference; determining an interference level component from the plurality of data resource elements subject to interference; and generating a hybrid noise plus interference level by combining the interference level component from the plurality of data resource elements subject to interference with the first noise plus interference level from the at least one predefined resource element.

Example 44 may include the method of example 43, wherein the plurality of data resource elements are subject to interference from a neighbor cell.

Example 45 may include the method of example 43, wherein the plurality of data resource elements are subject to interference from a microcell.

Example 46 may include the method of example 43, wherein the plurality of data resource elements are subject to interference from a picocell.

Example 47 may include the method of example 43, wherein the plurality of data resource elements are subject to interference from a femtocell.

Example 48 may include the method of example 43, wherein the at least one predefined resource element is designated for an interference measurement.

Example 49 may include the method of example 48, wherein the interference measurement is a channel state information interference measurement.

Example 50 may include the method of example 43, wherein the first noise plus interference level is a noise plus interference power level measurement.

Example 51 may include the method of example 50, wherein the first noise plus interference level is a noise plus interference power level channel state information interference measurement.

Example 52 may include the method of example 43, further including: determining the interference level component by measuring a cell specific reference signal and applying the measured cell specific reference signal level to the noise plus interference level from the plurality of data resource elements subject to interference.

Example 53 may include the method of example 52, wherein the measured cell specific reference signal level is a noise plus interference power level.

Example 54 may include the method of example 43, wherein the plurality of resource elements further includes: at least one further predefined resource element.

Example 55 may include the method of example 54, wherein the at least one further predefined resource element is a channel quality reference signal.

Example 56 may include the method of example 54, wherein the at least one further predefined resource element is a frequency scheduling reference signal.

Example 57 may include the method of example 54, wherein the at least one further predefined resource element is a channel state information reference signal.

Example 58 may include the method of example 43, wherein the plurality of resource elements further include: at least one further plurality of data resource elements subject to at least one further interference.

Example 59 may include the method of example 58, wherein the at least one further interference is different from the interference of the plurality of data resource elements subject to interference.

Example 60 may include the method of example 58 further including: determining at least one further interference level component from the at least one further plurality of data resource elements subject to at least one further interference; and generating at least one further hybrid noise plus interference level by combining the at least one further interference level component from the plurality of data resource elements subject to at least one further interference with the first noise plus interference level from the at least one predefined resource element.

Example 61 may include the method of example 43 further including: determining a modification factor for a covariance estimate of the measured first interference level.

Example 62 may include the method of example 61, wherein the modification factor is a power ratio scaling factor.

Example 63 may include the method of example 62, wherein the power ratio scaling factor is derived from the hybrid noise plus interference level and the noise plus interference level from the resource elements subject to interference.

Example 64 may include the method of example 61 wherein the model includes covariance data of the noise data.

Example 65 may include the method of example 61, wherein the model is a noise covariance matrix.

Example 66 may include the method of example 43 further including: generating a whitening filter output based on the modified covariance estimate.

Example 67 may include the method of example 66, wherein the whitening filter output is an output for inter-cell interference coordination.

Example 68 may include the method of example 66, wherein the whitening filter output is an output for enhanced inter-cell interference coordination.

Example 69 may include the method of example 66, wherein the whitening filter output is an output for further enhanced inter-cell interference coordination.

Example 70 may include the method of example 66, wherein generating the whitening filter output includes a Cholesky decomposition.

Example 71 may include the method of example 43 further including: incorporating the whitening filter output into feedback processing.

Example 72 may include the method of example 71, wherein the feedback processing includes: combining multiple independent noise and interference measurements.

Example 73 may include the method of example 71, wherein the feedback processing includes: weighted metric combining.

Example 74 may include the method of example 62, wherein the power ratio scaling factor includes: a sum of the hybrid noise plus interference level and the at least one further hybrid noise plus interference level, wherein each respective hybrid noise plus interference level is weighted by a respective number of corresponding resource elements to the plurality of resource elements.

Example 75 may include the method of example 74 further including: modifying the covariance estimate with the power ratio scaling factor.

Example 76 may include the method of example 74 further including: generating a whitening filter output based on the modified covariance estimate.

Example 77 may include the method of example 76, wherein the whitening filter output is an output for inter-cell interference coordination.

Example 78 may include the method of example 76, wherein the whitening filter output is an output for enhanced inter-cell interference coordination.

Example 79 may include the method of example 76 wherein the whitening filter output is an output for further enhanced inter-cell interference coordination.

Example 80 may include the method of example 76, wherein generating the whitening filter output includes a Cholesky decomposition.

Example 81 may include the method of example 76 further including: incorporating the whitening filter output into feedback processing.

Example 82 may include the method of example 81, wherein feedback processing includes a single noise and interference measurement.

Example 83 may include the method of example 82, wherein the single noise and interference measurement is the whitening filter output based on the modified covariance estimate.

An example 84 discloses a method for feedback processing, including: receiving a composite signal including a plurality of resource elements, the plurality of resource elements including: a plurality of data resource elements subject to interference; measuring an interference level on at least one predefined resource element from the plurality of resource elements; measuring a noise plus interference level on the plurality of data resource elements subject to interference; determining an interference level component from the plurality of data resource elements subject to interference; and generating a hybrid interference level by combining the interference level component from the plurality of data resource elements subject to interference with the interference level from the at least one predefined resource element.

An example 85 discloses a mobile communications device, including: a receiver configured to receive a composite signal including a plurality of resource elements, the plurality of resource elements including: a plurality of data resource elements subject to interference; a measuring circuit configured to measure a first noise plus interference level on at least one predefined resource element from the plurality of resource elements; the measuring circuit further configured to measure a noise plus interference level on the plurality of data resource elements subject to interference; a baseline determination circuit configured to measure a baseline noise plus interference level common to the plurality of data resource elements subject to interference; and a processing circuit configured to generate a hybrid noise plus interference level by replacing the baseline noise plus interference level with the first noise plus interference level from the at least one predefined resource element.

Example 86 may include the mobile communications device of example 85, wherein the plurality of data resource elements are subject to interference from a neighbor cell.

Example 87 may include the mobile communications device of example 85, wherein the plurality of data resource elements are subject to interference from a microcell.

Example 88 may include the mobile communications device of example 85, wherein the plurality of data resource elements are subject to interference from a picocell.

Example 89 may include the mobile communications device of example 85, wherein the plurality of data resource elements are subject to interference from a femtocell.

Example 90 may include the mobile communications device of example 85, wherein the at least one predefined resource element is designated for an interference measurement.

Example 91 may include the mobile communications device of example 90, wherein the interference measurement is a channel state information interference measurement.

Example 92 may include the mobile communications device of example 85, wherein the first noise plus interference level is a noise plus interference power level measurement.

Example 93 may include the mobile communications device of example 92, wherein the first noise plus interference level is a noise plus interference power level channel state information interference measurement.

Example 94 may include the mobile communications device of example 85, the baseline determination circuit configured to determine the baseline noise plus interference level by measuring a cell specific reference signal.

Example 95 may include the mobile communications device of example 94, wherein the baseline noise plus interference level is a noise plus interference power level.

Example 96 may include the mobile communications device of example 85, wherein the plurality of resource elements further includes: at least one further predefined resource element.

Example 97 may include the mobile communications device of example 96, wherein the at least one further predefined resource element is a channel quality reference signal.

Example 98 may include the mobile communications device of example 96, wherein the at least one further predefined resource element is a frequency scheduling reference signal.

Example 99 may include the mobile communications device of example 96, wherein the at least one further predefined resource element is a channel state information reference signal.

Example 100 may include the mobile communications device of example 85, wherein the plurality of resource elements further include: at least one further plurality of data resource elements subject to at least one further interference.

Example 101 may include the mobile communications device of example 100, wherein the at least one further interference is different from the interference of the plurality of data resource elements subject to interference.

Example 102 may include the mobile communications device of example 100, wherein the measurement circuit is further configured to measure at least one further noise plus interference level on the plurality of data resource elements subject to at least one further interference; and the processing circuit is further configured to generate at least one further hybrid noise plus interference level by replacing the baseline noise plus interference level with the first noise plus interference level from the at least one predefined resource element.

Example 103 may include the mobile communications device of example 85, the processing circuit further configured to determine a modification factor for a covariance estimate of the measured first interference level.

Example 104 may include the mobile communications device of example 103, wherein the modification factor is a power ratio scaling factor.

Example 105 may include the mobile communications device of example 104, wherein the power ratio scaling factor is derived from the hybrid noise plus interference level and the noise plus interference level from the resource elements subject to interference.

Example 106 may include the mobile communications device of example 103 wherein the model includes covariance data of the noise data.

Example 107 may include the mobile communications device of example 103, wherein the model is a noise covariance matrix.

Example 108 may include the mobile communications device of example 85 further including: the processing circuit further configured to generate a whitening filter output based on the modified covariance estimate.

Example 109 may include the mobile communications device of example 108, wherein the whitening filter output is an output for inter-cell interference coordination.

Example 110 may include the mobile communications device of example 108, wherein the whitening filter output is an output for enhanced inter-cell interference coordination.

Example 111 may include the mobile communications device of example 108, wherein the whitening filter output is an output for further enhanced inter-cell interference coordination.

Example 112 may include the mobile communications device of example 108, wherein generating the whitening filter output includes a Cholesky decomposition.

Example 113 may include the mobile communications device of example 85, the processing circuit further configured to incorporate the whitening filter output into feedback processing.

Example 114 may include the mobile communications device of example 113, wherein the feedback processing includes: combining multiple independent noise and interference measurements.

Example 115 may include the mobile communications device of example 113, wherein the feedback processing includes: weighted metric combining.

Example 116 may include the mobile communications device of example 104, wherein the power ratio scaling factor includes: a sum of the hybrid noise plus interference level and the at least one further hybrid noise plus interference level, wherein each respective hybrid noise plus interference level is weighted by a respective number of corresponding resource elements to the plurality of resource elements.

Example 117 may include the mobile communications device of example 116, the processing circuit further configured to modify the covariance estimate with the power ratio scaling factor.

Example 118 may include the mobile communications device of example 116, the processing circuit further configured to generate a whitening filter output based on the modified covariance estimate.

Example 119 may include the mobile communications device of example 118, wherein the whitening filter output is an output for inter-cell interference coordination.

Example 120 may include the mobile communications device of example 118, wherein the whitening filter output is an output for enhanced inter-cell interference coordination.

Example 121 may include the mobile communications device of example 118, wherein the whitening filter output is an output for further enhanced inter-cell interference coordination.

Example 122 may include the mobile communications device of example 118, wherein generating the whitening filter output includes a Cholesky decomposition.

Example 123 may include the mobile communications device of example 118, the processing circuit further configured to incorporate the whitening filter output into feedback processing.

Example 124 may include the mobile communications device of example 123, wherein feedback processing includes a single noise and interference measurement.

Example 125 may include the mobile communications device of example 124, wherein the single noise and interference measurement is the whitening filter output based on the modified covariance estimate.

An example 126 may disclose a mobile communications device including: a receiver configured to receive a composite signal including a plurality of resource elements, the plurality of resource elements including: a plurality of data resource elements subject to interference; a measuring circuit configured to measure an interference level on at least one predefined resource element from the plurality of resource elements; the measuring circuit further configured to measure a noise plus interference level on the plurality of data resource elements subject to interference; a baseline determination circuit configured to determine a baseline noise level common to the plurality of data resource elements subject to interference; and a processing circuit configured to generate a hybrid interference level by replacing the baseline noise level with the interference level from the at least one predefined resource element.

An example 127 may disclose a mobile communications device including: a receiver configured to receive a composite signal including a plurality of resource elements, the plurality of resource elements including: a plurality of data resource elements subject to interference; a measuring circuit configured to measure an interference level on at least one predefined resource element from the plurality of resource elements; the measuring circuit further configured to measure a noise plus interference level on the plurality of data resource elements subject to interference; a determination circuit configured to determine an interference level component from the plurality of data resource elements subject to interference; and a processing circuit configured to generate a hybrid noise plus interference level by combining the interference level component from the plurality of data resource elements subject to interference with the first noise plus interference level from the at least one predefined resource element.

Example 128 may include the mobile communications device of example 127, wherein the plurality of data resource elements are subject to interference from a neighbor cell.

Example 129 may include the mobile communications device of example 127, wherein the plurality of data resource elements are subject to interference from a microcell.

Example 130 may include the mobile communications device of example 127, wherein the plurality of data resource elements are subject to interference from a picocell.

Example 131 may include the mobile communications device of example 127, wherein the plurality of data resource elements are subject to interference from a femtocell.

Example 132 may include the mobile communications device of example 127, wherein the at least one predefined resource element is designated for an interference measurement.

Example 133 may include the mobile communications device of example 132, wherein the interference measurement is a channel state information interference measurement.

Example 134 may include the mobile communications device of example 127, wherein the first noise plus interference level is a noise plus interference power level measurement.

Example 135 may include the mobile communications device of example 134, wherein the first noise plus interference level is a noise plus interference power level channel state information interference measurement.

Example 136 may include the mobile communications device of example 127, further including: the determination circuit configured to determine the interference level component by measuring a cell specific reference signal and further configured to apply the measured cell specific reference signal level to the noise plus interference level from the plurality of data resource elements subject to interference.

Example 137 may include the mobile communications device of example 136, wherein the measured cell specific reference signal level is a noise plus interference power level.

Example 138 may include the mobile communications device of example 127, wherein the plurality of resource elements further includes: at least one further predefined resource element.

Example 139 may include the mobile communications device of example 138, wherein the at least one further predefined resource element is a channel quality reference signal.

Example 140 may include the mobile communications device of example 138, wherein the at least one further predefined resource element is a frequency scheduling reference signal.

Example 141 may include the mobile communications device of example 138, wherein the at least one further predefined resource element is a channel state information reference signal.

Example 142 may include the mobile communications device of example 127, wherein the plurality of resource elements further include: at least one further plurality of data resource elements subject to at least one further interference.

Example 143 may include the mobile communications device of example 142, wherein the at least one further interference is different from the interference of the plurality of data resource elements subject to interference.

Example 144 may include the mobile communications device of example 142, the determination circuit further configured to determine at least one further interference level component from the at least one further plurality of data resource elements subject to at least one further interference; and the processing circuit further configured to generate at least one further hybrid noise plus interference level by combining the at least one further interference level component from the plurality of data resource elements subject to at least one further interference with the first noise plus interference level from the at least one predefined resource element.

Example 145 may include the mobile communications device of example 127, the determination circuit further configured to determine a modification factor for a covariance estimate of the measured first interference level.

Example 146 may include the mobile communications device of example 145, wherein the modification factor is a power ratio scaling factor.

Example 147 may include the mobile communications device of example 146, wherein the power ratio scaling factor is derived from the hybrid noise plus interference level and the noise plus interference level from the resource elements subject to interference.

Example 148 may include the mobile communications device of example 145 wherein the model includes covariance data of the noise data.

Example 149 may include the mobile communications device of example 145, wherein the model is a noise covariance matrix.

Example 150 may include the mobile communications device of example 127, the processing circuit further configured to generate a whitening filter output based on the modified covariance estimate.

Example 151 may include the mobile communications device of example 150, wherein the whitening filter output is an output for inter-cell interference coordination.

Example 152 may include the mobile communications device of example 150, wherein the whitening filter output is an output for enhanced inter-cell interference coordination.

Example 153 may include the mobile communications device of example 150, wherein the whitening filter output is an output for further enhanced inter-cell interference coordination.

Example 154 may include the mobile communications device of example 150, wherein generating the whitening filter output includes a Cholesky decomposition.

Example 155 may include the mobile communications device of example 127, the processing circuit further configured to incorporate the whitening filter output into feedback processing.

Example 156 may include the mobile communications device of example 155, wherein the feedback processing includes: combining multiple independent noise and interference measurements.

Example 157 may include the mobile communications device of example 155, wherein the feedback processing includes: weighted metric combining Example 158 may include the mobile communications device of example 146, wherein the power ratio scaling factor includes: a sum of the hybrid noise plus interference level and the at least one further hybrid noise plus interference level, wherein each respective hybrid noise plus interference level is weighted by a respective number of corresponding resource elements to the plurality of resource elements.

Example 159 may include the mobile communications device of example 158, the processing circuit further configured to modify the covariance estimate with the power ratio scaling factor.

Example 160 may include the mobile communications device of example 158, the processing circuit configured to generate a whitening filter output based on the modified covariance estimate.

Example 161 may include the mobile communications device of example 160, wherein the whitening filter output is an output for inter-cell interference coordination.

Example 162 may include the mobile communications device of example 160, wherein the whitening filter output is an output for enhanced inter-cell interference coordination.

Example 163 may include the mobile communications device of example 160 wherein the whitening filter output is an output for further enhanced inter-cell interference coordination.

Example 164 may include the mobile communications device of example 160, wherein generating the whitening filter output includes a Cholesky decomposition.

Example 165 may include the mobile communications device of example 160, the processing circuit configured to incorporate the whitening filter output into feedback processing.

Example 166 may include the mobile communications device of example 165, wherein feedback processing includes a single noise and interference measurement.

Example 167 may include the mobile communications device of example 166, wherein the single noise and interference measurement is the whitening filter output based on the modified covariance estimate.

An example 168 may disclose a mobile communications device including: a receiver configured to receive a composite signal including a plurality of resource elements, the plurality of resource elements including: a plurality of data resource elements subject to interference; a measuring circuit configured to measure an interference level on at least one predefined resource element from the plurality of resource elements; the measuring circuit further configured to measure a noise plus interference level on the plurality of data resource elements subject to interference; the determination circuit configured to determine an interference level component from the plurality of data resource elements subject to interference; and the processing circuit configured to generate a hybrid interference level by combining the interference level component from the plurality of data resource elements subject to interference with the interference level from the at least one predefined resource element.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communications device, comprising:
a receiver configured to receive a composite signal comprising a plurality of resource elements having a first plurality of data resource elements subject to a first interference;
a measuring circuit configured to measure a first noise plus interference level on at least one predefined resource element of the plurality of resource elements;
the measuring circuit further configured to measure a noise plus interference level on the first plurality of data resource elements subject to the first interference;
a baseline measurement circuit configured to measure a baseline noise plus interference level common to the first plurality of data resource elements subject to the first interference; and
a processing circuit configured to generate a first hybrid noise plus interference level by replacing the baseline noise plus interference level with the first noise plus interference level from the at least one predefined resource element.

2. The mobile communications device of claim 1, wherein the at least one predefined resource element is designated for an interference measurement.

3. The mobile communications device of claim 1, the baseline measurement circuit configured to calculate the baseline noise plus interference level by measuring a cell-specific reference signal.

4. The mobile communications device of claim 1, wherein the plurality of resource elements further comprise: a second plurality of data resource elements subject to a second interference.

5. The mobile communications device of claim 4, wherein the second interference is different from the first interference of the first plurality of data resource elements subject to the first interference.

6. The mobile communications device of claim 4, wherein the measuring circuit is further configured to measure at least one second noise plus interference level on the second plurality of data resource elements subject to the second interference; and
the processing circuit is further configured to generate at least one second hybrid noise plus interference level by replacing the baseline noise plus interference level with the first noise plus interference level from the at least one predefined resource element.

7. The mobile communications device of claim 1, the processing circuit further configured to determine a modification factor for a covariance estimate of the measured first noise plus interference level.

8. The mobile communications device of claim 1 further comprising:
the processing circuit further configured to generate a whitening filter output based on the modified covariance estimate.

9. The mobile communications device of claim 1,
the processing circuit further configured to incorporate the whitening filter output into feedback processing.

10. The mobile communications device of claim 8,
wherein the feedback processing comprises:
combining multiple independent noise and interference measurements.

11. The mobile communications device of claim 7,
wherein the modification factor is a power ratio scaling factor,
wherein the power ratio scaling factor comprises:
a sum of the hybrid noise plus interference level and the at least one second hybrid noise plus interference level,
wherein each respective hybrid noise plus interference level is weighted by a respective number of corresponding resource elements to the plurality of resource elements.

12. The mobile communications device of claim 11,
the processing circuit further configured to modify the covariance estimate with the power ratio scaling factor.

13. The mobile communications device of claim 11,
the processing circuit further configured to generate a whitening filter output based on the modified covariance estimate.

14. The mobile communications device of claim 13,
wherein generating the whitening filter output comprises a Cholesky decomposition.

15. The mobile communications device of claim 14,
the processing circuit further configured to incorporate the whitening filter output into feedback processing.

16. The mobile communications device of claim 15,
wherein feedback processing comprises a single noise and interference measurement.

17. A mobile communications device comprising:
a receiver configured to receive a composite signal comprising a plurality of resource elements having a first plurality of data resource elements subject to a first interference;
a measuring circuit configured to measure an interference level on at least one predefined resource element of the plurality of resource elements;
the measuring circuit further configured to measure a noise plus interference level on the first plurality of data resource elements subject to the first interference;
a determination circuit configured to determine a first interference level component from the first plurality of data resource elements subject to the first interference; and
a processing circuit configured to generate a hybrid noise plus interference level by combining the first interference level component from the first plurality of data resource elements subject to the first interference with the first noise plus interference level from the at least one predefined resource element.

18. The mobile communications device of claim 17,
wherein the plurality of resource elements further comprise: a second plurality of data resource elements subject to a second interference.

19. A method for feedback processing, comprising:
receiving a composite signal comprising a plurality of resource elements having a first plurality of data resource elements subject to a first interference;
measuring a first noise plus interference level on at least one predefined resource element of the plurality of resource elements;
measuring a noise plus interference level on the first plurality of data resource elements subject to the first interference;
measuring a baseline noise plus interference level common to the first plurality of data resource elements subject to the first interference; and
generating a hybrid noise plus interference level by replacing the baseline noise plus interference level with the first noise plus interference level of the at least one predefined resource element.

20. The method of claim 19,
wherein the plurality of resource elements further comprise: a second plurality of data resource elements subject to a second interference.

* * * * *